(12) United States Patent
Henderson

(10) Patent No.: US 10,624,481 B1
(45) Date of Patent: Apr. 21, 2020

(54) MOUNTING DEVICE FOR AN OBJECT SUCH AS A TOWEL, A DISH CLOTH, A POTHOLDER, AN OVEN MITT, AND THE LIKE, AND COMBINATION OF THE MOUNTING DEVICE AND THE OBJECT

(71) Applicant: Scott Henderson, Brooklyn, NY (US)

(72) Inventor: Scott Henderson, Brooklyn, NY (US)

(73) Assignee: SHEN MANUFACTURING COMPANY INCORPORATED, West Conshohocken, PA (US)

( * ) Notice: Subject to any disclaimer, the term of this patent is extended or adjusted under 35 U.S.C. 154(b) by 0 days.

(21) Appl. No.: 15/716,198

(22) Filed: Sep. 26, 2017

(51) Int. Cl.
  *A47F 7/14* (2006.01)
  *A47F 7/16* (2006.01)
  *A47G 29/00* (2006.01)
  *F16M 13/02* (2006.01)
  *F16M 13/00* (2006.01)

(52) U.S. Cl.
  CPC .......... *A47G 29/00* (2013.01); *F16M 13/005* (2013.01); *F16M 13/022* (2013.01); *A47F 7/143* (2013.01); *A47F 7/163* (2013.01)

(58) Field of Classification Search
  USPC .............. 248/301, 304, 305, 339, 690, 692; 223/87, 88; D8/367; D9/415; D6/315, D6/318, 319, 320, 323, 325, 326, 328; 211/106.01
  See application file for complete search history.

(56) References Cited

U.S. PATENT DOCUMENTS

| | | | | |
|---|---|---|---|---|
| D163,568 S | * | 6/1951 | Brummel | D8/356 |
| 3,032,242 A | * | 5/1962 | Roberts | A47G 25/743 206/806 |
| 3,317,096 A | * | 5/1967 | Bissonnette | A47G 25/30 223/88 |
| 3,698,043 A | * | 10/1972 | Batts | A44B 99/00 223/87 |
| 3,698,607 A | * | 10/1972 | Batts | A47G 25/485 223/96 |
| 3,755,859 A | * | 9/1973 | Solari | A47G 25/48 223/85 |
| 4,012,811 A | * | 3/1977 | Mazzaferro | D06F 55/00 223/91 |
| D249,019 S | * | 8/1978 | Fredriksson | D8/367 |
| 4,943,026 A | * | 7/1990 | Fildan | B65D 25/22 24/561 |
| 5,094,414 A | * | 3/1992 | Eddy, Jr. | B65D 33/14 211/113 |
| 5,129,557 A | * | 7/1992 | Kolton | A47G 25/48 223/85 |
| 5,615,810 A | * | 4/1997 | Kolton | A47G 25/483 223/85 |

(Continued)

*Primary Examiner* — Alfred J Wujciak
(74) *Attorney, Agent, or Firm* — John F. A. Earley, III; Harding, Earley, Follmer & Frailey, P.C.

(57) ABSTRACT

A mounting device for securing an object, such as a towel, a dish cloth, a potholder, or an oven mitt, to a handle, such as a refrigerator handle, an oven door handle, a drawer handle, or a cabinet handle, comprises a body, a hooking component formed on the body for removably hooking the device onto the handle when desired, and a connecting component formed on the body for connecting the object to the body. The object may be removably affixed to the connecting component or permanently affixed to the connecting component.

17 Claims, 2 Drawing Sheets

(56) References Cited

U.S. PATENT DOCUMENTS

| | | | | |
|---|---|---|---|---|
| 5,620,118 | A | * | 4/1997 | Kolton ................. A47G 25/743 |
| | | | | 223/85 |
| 5,857,597 | A | * | 1/1999 | Kolton .................. A47F 5/0006 |
| | | | | 150/131 |
| 5,967,388 | A | * | 10/1999 | Kolton .................. A47G 25/50 |
| | | | | 223/85 |
| D757,455 | S | * | 5/2016 | Belcher .......................... D6/328 |
| 2012/0024914 | A1 | * | 2/2012 | Norman ................ A47F 5/0006 |
| | | | | 223/85 |
| 2015/0114309 | A1 | * | 4/2015 | Davison, III ........ A01K 15/026 |
| | | | | 119/709 |

* cited by examiner

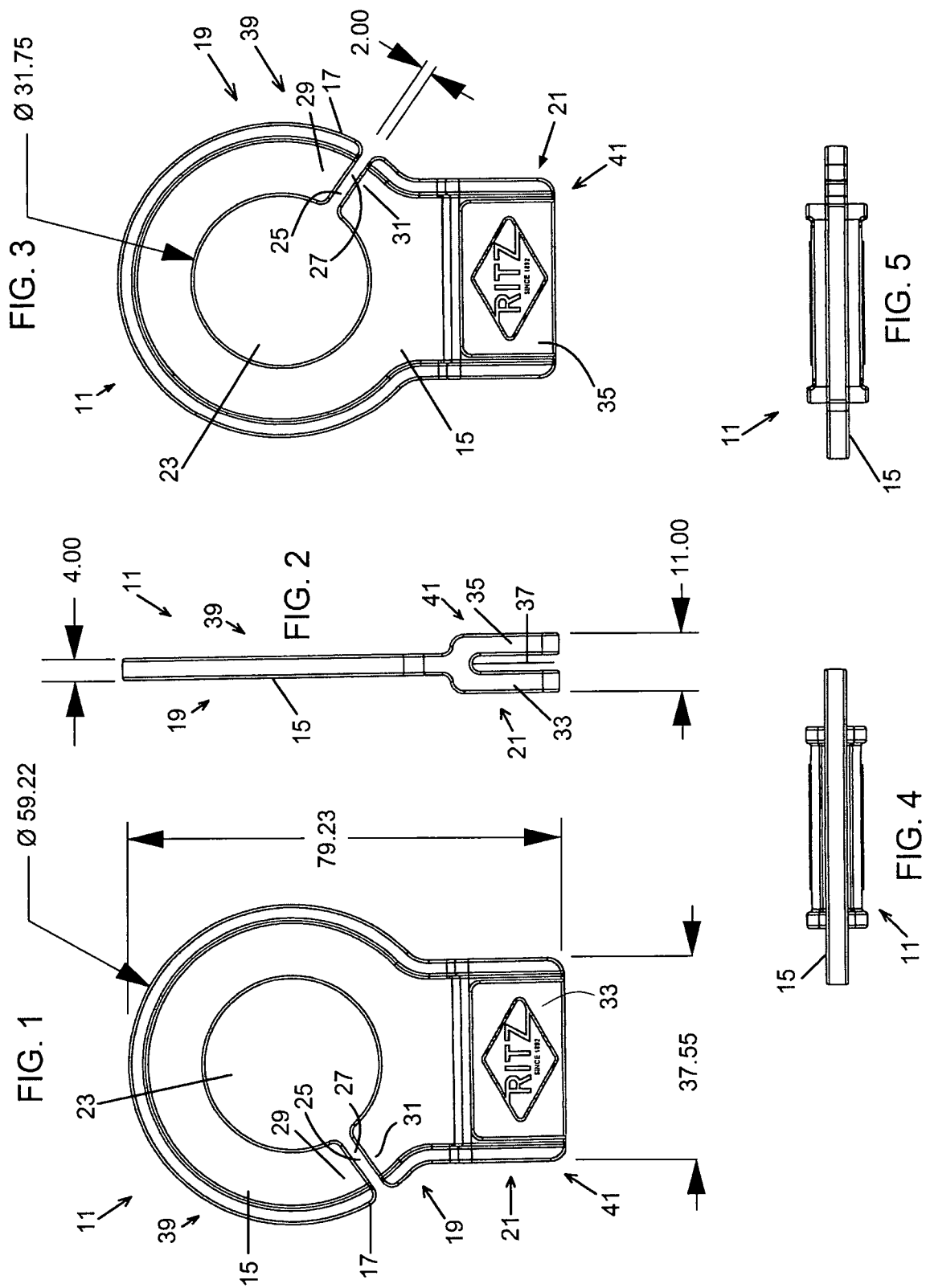

MOUNTING DEVICE FOR AN OBJECT SUCH AS A TOWEL, A DISH CLOTH, A POTHOLDER, AN OVEN MITT, AND THE LIKE, AND COMBINATION OF THE MOUNTING DEVICE AND THE OBJECT

FIELD OF THE INVENTION

This invention relates to devices for securing objects in desired locations, and more particularly is concerned with devices for securing objects such as towels, dish cloths, potholders, and oven mitts in locations to make such objects easily assessable and conveniently positioned for use.

BACKGROUND OF THE INVENTION

Items, such as towels, dish cloths, potholders, and oven mitts, are often stored in a drawer in the kitchen until they are desired to be used, and when they are desired to be used, they are removed from the drawer and used periodically throughout the process of preparing a meal and cleaning up after the meal (hereinafter referred to as "the meal preparation/cleaning up process"). When not specifically being used during the meal preparation/cleaning up process, these items are typically placed onto a countertop, rather than back into the drawer, so as to be within easy reach to be used when needed. Not only is it not convenient to move such items repeatedly back and forth into and from the drawer during the meal preparation/cleaning up process, since such items would no longer be within easy reach for use each time such items were replaced into the drawer, after such items have been used, no one would want to place a dishcloth, a towel, a potholder, or an oven mitt that is wet or partly covered with food back into the drawer.

While potholders and oven mitts sometimes are provided with a small loop to hang such items on a nail or a hook protruding from a wall, many home owners avoid adding protruding nails and hooks to their walls for safety reasons and aesthetic reasons. So when potholders and oven mitts, as well as dish cloths and towels, are not in actual use during the meal preparation/cleaning up process, they are typically placed within easy reach by placing them on a nearby countertop, which creates a problem of reducing available countertop space that is available for meal preparation.

SUMMARY OF THE INVENTION

It is an object of the invention to provide a device for removably securing an object, such as a towel, a dish cloth, a potholder, or an oven mitt, to a handle, such as a refrigerator handle, an oven door handle, a cabinet handle, or a drawer handle, so that the object is conveniently positioned and within easy reach to be used, for example, during the meal preparation/cleaning up process.

It is another object of the invention to provide an inventive combination of an object, such as a towel, a dish cloth, a potholder, or an oven mitt, and a device for removably securing the object to a handle, such as a refrigerator handle, an oven door handle, a cabinet handle, or a drawer handle, so that the object is conveniently positioned and within easy reach to be used, for example, during the meal preparation/ cleaning up process, wherein the object is removably affixed to the device.

Still another object of the invention is to provide an inventive combination of an object, such as a towel, a dish cloth, a potholder, or an oven mitt, and a device for removably securing the object to a handle, such as a refrigerator handle, an oven door handle, a cabinet handle, or a drawer handle, so that the object is conveniently positioned and within easy reach to be used, for example, during the meal preparation/cleaning up process, wherein the object is permanently affixed to the device.

These and other objects are provided by the invention which is set out below in detail.

BRIEF DESCRIPTION OF THE DRAWINGS

FIG. 1 is a view in front elevation of a device, constructed in accordance with the invention, for removably securing an object, such as a towel, a dish cloth, a potholder, or an oven mitt, to a handle, such as a refrigerator handle, an oven door handle, a cabinet handle, or a drawer handle, so that the object is conveniently positioned and within easy reach to be used, for example, during the meal preparation/cleaning up process.

FIG. 2 is a view in side elevation of the device shown in FIG. 1.

FIG. 3 is a view in rear elevation of the device shown in FIG. 1.

FIG. 4 is a top plan view of the device shown in FIG. 3.

FIG. 5 is a bottom plan view of the device shown in FIG. 3.

DETAILED DESCRIPTION

Figure 6:
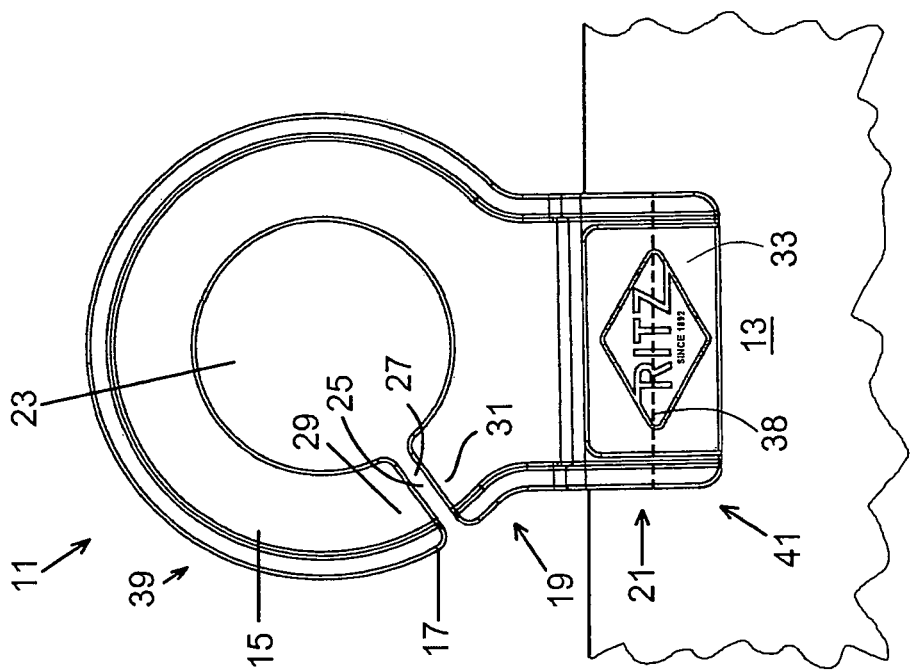
FIG. 6 is a view in front elevation of the device shown in FIG. 1 removably affixed to an object, such as a towel, a dish cloth, a potholder, or an oven mitt, with only a portion of the object being shown.

Turning now to the drawings, there is shown the inventive device 11 for securing an object 13, such as a towel, a dish cloth, a potholder, or an oven mitt, to a handle, such as a refrigerator handle, an oven door handle, a drawer handle, or a cabinet handle, so that the object 13 is conveniently positioned and within easy reach to be used, for example, during the meal preparation/cleaning up process.

Preferably, the device 11 has a body 15 having an outer periphery 17, and the body 15 has a hooking component 19 for removably hooking the device 11 onto a handle, such as a refrigerator handle, an oven door handle, a cabinet handle, or a drawer handle, when desired, and a connecting component 21 for connecting the device 11 to an object 13.

The hooking component 19 preferably is formed in the body 15 by a first opening or cut-out portion 23 that is formed in the body 15 and extends completely through the body 15, in combination with a second opening 25 that is formed in the body 15 and extends completely through it. The second opening 25 extends from the outer periphery 17 of the body 15 to the first opening 23, creating a passageway or slot 27 that extends from outside the body 15 to the first opening 23. The passageway or slot 27 has a length that extends from the outer periphery 17 of the body 15 to the first opening 23.

Preferably, the passageway or slot 27 is bordered by a first portion 29 of the body 15 and a second portion 31 of the body 15, with the first portion 29 of the body 15 and the second portion 31 of the body 15 being positioned on opposite sides of the passageway or slot 27 from each other separated by the passageway or slot 27. The device 11 is sufficiently flexible and resilient such that the first portion 29 of the body 15 and the second portion 31 of the body 15 may be manipulated with respect to one another to widen the width of the passageway or slot 27 sufficiently to permit the hooking component 19 to be hooked onto a handle (e.g., a refrigerator handle, an oven door handle, a drawer handle, or a cabinet handle) by inserting the device 11 onto the handle such that the handle traverses the passageway or slot 27 to position the handle within the first opening 23, as well as to permit the hooking component 19 to be unhooked from a handle by pulling the device 11 from the handle such that the handle leaves the first opening 23 and traverses back along the passageway or slot 27 until it is no longer within the passageway or slot 27 to thereby release the device 11 from the handle when desired. Because the device 11 is sufficiently flexible and resilient, the first portion 29 of the body 15 and the second portion 31 of the body 15 may be manipulated with respect to one another to flex to widen the width of the passageway or slot 27 sufficiently to permit the handle to fit between the first and second portions 29 and 31 of the body 15 as the handle traverses the passageway or slot 27 that leads to the first opening 23, and when the handle has been positioned in the first opening 23, the first and second portions 29 and 31 tend to rebound back to their original positions with respect to one another, resulting in the device 11 being secured onto the handle. Likewise, because the device 11 is sufficiently flexible and resilient, the first portion 29 of the body 15 and the second portion 31 of the body 15 may be manipulated with respect to one another to flex to widen the width of the passageway or slot 27 sufficiently to permit the handle to fit between the first and second portions 29 and 31 of the body 15 as the handle traverses the passageway or slot 27 when the device 11 (with the object 13 attached thereto) is pulled off the handle, and when the device 11 has been pulled off the handle, the first and second portions 29 and 31 tend to rebound back to their original positions with respect to one another, placing the device 11 in a condition ready to be pushed or pulled back onto a handle to secure the device 11 (with the object 13 affixed thereto) back onto a handle. Preferably, the device 11 is made of a flexible, resilient, durable, sturdy material. Preferably, the device 11 is a single unitary piece made of a flexible, resilient, durable, sturdy material. Preferably, the device 11 is sufficiently resistant to heat to withstand being machine washed and machine dried so that it may be safely washed in a washing machine and dried in a dryer. Preferably, the material is a thermoplastic rubber, a thermoplastic elastomer, rubber, a polymer, a polymer blend, or a combination thereof. In a preferred embodiment, the device 11 is a single piece of injection molded thermoplastic rubber.

Figure 7:
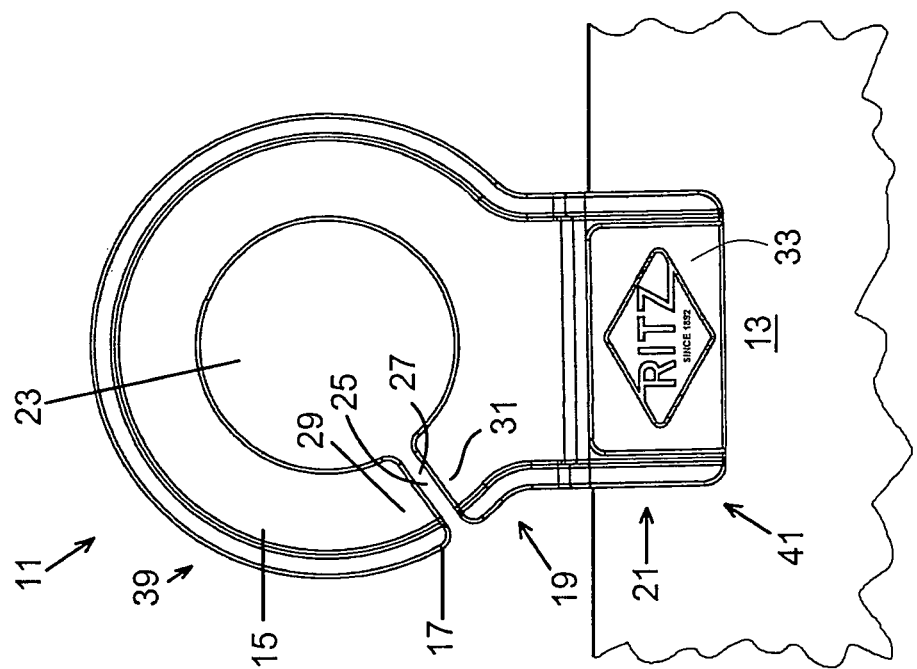
FIG. 7 is a front elevation of the device shown in FIG. 1 permanently affixed to an object, such as a towel, a dish cloth, a potholder, or an oven mitt, with only a portion of the object being shown.

The connecting component 21 preferably is formed in the body 15 by a pair of outwardly extending opposed flanges 33 and 35 that preferably are spaced sufficiently close to each other to create a space 37 therebetween to snugly receive a portion of an object 13. Preferably, the space 37 is sized to hold a portion of an object 13 in place between the flanges 33 and 35 via an interference fit (also known as a press fit and as a friction fit) to securely affix the body 15 and the object 13 together, as shown in FIG. 6, until it is desired to separate the body 15 from the object 13 by pulling the body 15 and the object 13 apart from one another. Alternatively, as shown in FIG. 7, the object 13 may be permanently affixed to the device 11, preferably by sewing a portion of the object 13 positioned between the flanges 33 and 35 to the device 11 at the flanges 33 and 35, preferably using thread 38 made of cotton, nylon, or other suitable material that extends through the object 13 and both flanges 33 and 35 to permanently affix the object 13 to the device 11.

In general, the invention includes hooking means 39 formed on the body 15 for hooking the device 11 onto a handle (e.g., a refrigerator handle, an oven door handle, a drawer handle, or a cabinet handle), and connecting means 41 for connecting the body 15 to an object 13 (e.g., a towel, a dish cloth, a potholder, or an oven mitt). The hooking means 39 preferably comprises the hooking component 19 discussed above, and the connecting means 41 preferably comprises the connecting component 21 discussed above.

In use, in one embodiment of the invention, the device 11 may be connected to an object 13 by inserting a portion of the object 13 into the space 37 between the flanges 33 and 35 to create an interference fit with the portion of the object 13 positioned between the flanges 33 and 35 and with the flanges 33 and 35 squeezing said portion of the object 13 tightly therebetween to securely affix the object 13 to the device 11. Then, when it is desired to hook the device 11, which has the object 13 attached thereto, onto a handle, such as a refrigerator handle, an oven door handle, a drawer handle, or a cabinet handle, to secure the object 13 to the handle, so that the object is conveniently positioned and within easy reach to be used, for example, during the meal preparation/cleaning up process, the device 11 may be positioned against the handle such that the passageway or slot 27, at its end at the outer periphery 17 of the body 15, is positioned against the handle, and then the device 11 may be pushed or pulled onto the handle, causing the first and second portions 29 and 31 of the body 15 to flex and move apart to widen the passageway or slot 27 as the handle traverses the passageway or slot 27, until the handle has completely traversed the full length of the passageway or slot 27 and the handle is positioned in the first opening 23 of the device 11. When the handle is positioned in the first opening 23, the first and second portions 29 and 31 tend to rebound back to their original positions with respect to one another, resulting in the device 11 being secured onto the handle.

The user may remove the object 13 from its hanging position on the handle anytime the user wishes by pulling on the device 11, or on the object 13 affixed to the device 11, to cause a pressing of the device 11, near where the passageway or slot 27 meets the first opening 23, against the handle and a flexing of the first and second portions 29 and 31 to widen the passageway or slot 27 to permit the handle to traverse the passageway or slot 27 away from the first opening 23 to release the device 11 (and the object 13 affixed thereto) from the handle.

The device 11, with an object 13 affixed thereto, may be secured to a handle when the object 13 is not being used, and may be released from the handle when it is desired to use the object 13. The device 11, with an object 13 affixed thereto, may be repeatedly secured to and released from a handle. Accordingly, as stated above, the device 11 preferably is made of a flexible, resilient, durable, sturdy material, which allows the first and second portions 29 and 31 of the body 15 to be repeatedly flexed or manipulated with respect to each other to permit the width of the passageway or slot 27 to widen sufficiently wide enough to permit a handle to fit in the passageway or slot 27 as a handle is traversing the passageway or slot 27, and which allows the device 11 and the first and second portions 29 and 31 of the body 15 to repeatedly return to their original shape after a handle has traversed the passageway or slot 27.

Because the device 11, with an object 13 affixed thereto, may be secured to a handle when the object 13 is not being used, available countertop space need not be reduced by storing the object 13 on the countertop.

Exemplary dimensions for the device 11 are shown in the drawings, with lengths being in millimeters. However, a variety of different dimensions may be used.

The device 11, with an object 13 affixed hereto, may be used in any location where it is desired to hook an object 13, such as a towel, a dish cloth, a potholder, or an oven mitt, onto a handle or the like. A preferred location is the kitchen. However, for example, the device 11 may be used to hang an object 13, such as a towel, from a shower rod or a towel bar or towel rod in the bathroom, or from a clothesline.

What is claimed is:

1. A device for securing an object to a handle, comprising a body, the body having an outer periphery,
the body having a hooking component for hooking the device onto a handle and a connecting component for connecting the device to an object,
the hooking component being formed in the body by a first opening formed in the body and extending completely through the body in combination within a second opening formed in the body and extending completely through the body,
the second opening extending from the outer periphery of the body to the first opening creating a passageway extending from outside the body to the first opening, the passageway having a length extending from the outer periphery of the body to the first opening,
the passageway being bordered by a first portion of the body and a second portion of the body, the first portion of the body extending along the length of the passageway, the second portion of the body extending along the length of the passageway, and the first portion of the body and the second portion of the body being positioned on opposite sides of the passageway from each other separated by the passageway, and
the connecting component being formed in the body by a groove extending completely across and into a portion of the body thereby forming a pair of outwardly extending opposed flanges, the pair of outwardly extending opposed flanges comprising a first flange and a second flange, the first and second flanges having distal ends, the groove being open-ended at the distal ends of the first and second flanges, the groove having a length, the groove extending across the body of the device along a plane that extends along the entire length of the groove equally spaced from the first and second flanges and that bisects the device into two mirror image halves, the first flange having an inner surface adjacent to the groove, the second flange having an inner surface adjacent to the groove, the groove creating a space between the inner surface of the first flange and the inner surface of the second flange, the groove having a width defined by the space between the inner surface of the first flange and the inner surface of the second flange, the inner surface of the first flange being permanently oriented to face towards the inner surface of the second flange and being permanently spaced from the inner surface of the second flange by the width of the groove, the width of the groove always being substantially the same, and the outwardly extending opposed flanges being spaced sufficiently close to each other for a portion of the object to be snugly received in the groove therebetween,
wherein the device is formed from a flexible resilient material,
wherein the device is sufficiently flexible and resilient in that the first and second portions of the body may be manipulated with respect to one another to permit the hooking component to be hooked onto a handle by inserting the device onto the handle such that the first and second portions of the body are moved apart from one another to create sufficient space between the first and second portions of the body to permit the handle to traverse the length of the passageway and move into the first opening of the body and such that after the handle has traversed the length of the passageway and moved into the first opening of the body the first and second portions of the body tend to rebound back to positions that the first and second portions of the body had with respect to one another prior to the handle traversing the length of the passageway and moving into the first opening of the body so that the first and second portions of the body at the first opening block removal of the device from the handle until the first and second portions of the body are manipulated with respect to one another again to permit the hooking component to be unhooked from the handle by pulling on the device so that the handle pushes the first and second portions of the body apart from one another to create sufficient space between the first and second portions of the body to permit the handle to exit from the first opening, traverse the length of the passageway, and exit from the passageway at the periphery of the body, and
wherein the connecting component has only one means for securely affixing an object to the connecting component, said one means being an interference fit created by the first flange and the second flange squeezing a portion of the object placed therebetween tightly to securely affix the object to the connecting component.

2. The device of claim 1, wherein the device is a single piece of injection molded thermoplastic rubber.

3. The device of claim 1, wherein the device is a single unitary piece.

4. The device of claim 1, wherein the material is a thermoplastic rubber, a thermoplastic elastomer, rubber, a polymer, or a combination thereof.

5. In combination, an object and the device of claim 1, wherein the object is a towel, a dish cloth, a potholder, or an oven mitt.

6. The device of claim 1,
wherein the device has only one connecting component.

7. A combination of an object and a device for securing an object to a handle,
the device comprising a body, the body having an outer periphery,
the body having a hooking component for hooking the device onto a handle and a connecting component for connecting the device to an object,
the hooking component being formed in the body by a first opening formed in the body and extending completely through the body in combination within a second opening formed in the body and extending completely through the body,
the second opening extending from the outer periphery of the body to the first opening creating a passageway extending from outside the body to the first opening, the passageway having a length extending from the outer periphery of the body to the first opening,
the passageway being bordered by a first portion of the body and a second portion of the body, the first portion of the body extending along the length of the passageway, the second portion of the body extending along the length of the passageway, and the first portion of the body and the second portion of the body being positioned on opposite sides of the passageway from each other separated by the passageway, and the connecting component being formed in the body by a groove extending completely across and into a portion of the body thereby forming a pair of outwardly extending opposed flanges, the pair of outwardly extending opposed flanges comprising a first flange and a second flange, the first and second flanges having distal ends, the groove being open-ended at the distal ends of the first and second flanges, the groove having a length, the groove extending across the body of the device along a plane that extends along the entire length of the groove equally spaced from the first and second flanges and that bisects the device into two mirror image halves, the first flange having an inner surface adjacent to the groove, the second flange having an inner surface adjacent to the groove, the groove creating a space between the inner surface of the first flange and the inner surface of the second flange, the groove having a width defined by the space between the inner surface of the first flange and the inner surface of the second flange, the inner surface of the first flange being permanently oriented to face towards the inner surface of the second flange and being permanently spaced from the inner surface of the second flange by the width of the groove, the width of the groove always being substantially the same, and the outwardly extending opposed flanges being spaced sufficiently close to each other for a portion of the object to be snugly received in the groove therebetween, wherein the device is a single unitary piece, wherein the device is formed from a flexible resilient material, wherein the device is a single piece of injection molded thermoplastic rubber, wherein the device is sufficiently flexible and resilient in that the first and second portions of the body may be manipulated with respect to one another to permit the hooking component to be hooked onto a handle by inserting the device onto the handle such that the first and second portions of the body are moved apart from one another to create sufficient space between the first and second portions of the body to permit the handle to traverse the length of the passageway and move into the first opening of the body and such that after the handle has traversed the length of the passageway and moved into the first opening of the body the first and second portions of the body tend to rebound back to positions that the first and second portions of the body had with respect to one another prior to the handle traversing the length of the passageway and moving into the first opening of the body so that the first and second portions of the body at the first opening block removal of the device from the handle until the first and second portions of the body are manipulated with respect to one another again to permit the hooking component to be unhooked from the handle by pulling on the device so that the handle pushes the first and second portions of the body apart from one another to create sufficient space between the first and second portions of the body to permit the handle to exit from the first opening, traverse the length of the passageway, and exit from the passageway at the periphery of the body, wherein the connecting component has only one means for securely affixing an object to the connecting component, said one means being an interference fit created by the first flange and the second flange squeezing a portion of the object placed therebetween tightly to securely affix the object to the connecting component, and wherein the object is a towel, a dish cloth, a potholder, or an oven mitt.

8. The device of claim 7,
wherein the device has only one connecting component.

9. In combination, an object and a device for securing the object to a handle,
the device comprising
a body,
a hooking component formed on the body for hooking the device onto a handle when desired, and
a connecting component formed on the body for connecting the object to the body, the connecting component being formed in the body by a groove extending completely across and into a portion of the body thereby forming a pair of outwardly extending opposed flanges, the pair of outwardly extending opposed flanges comprising a first flange and a second flange, the first flange having an inner surface adjacent to the groove, the second flange having an inner surface adjacent to the groove, the groove creating a space between the inner surface of the first flange and the inner surface of the second flange, the groove having a width defined by the space between the inner surface of the first flange and the inner surface of the second flange, the inner surface of the first flange being permanently oriented to face towards the inner surface of the second flange and being permanently spaced from the inner surface of the second flange by the width of the groove, the width of the groove always being substantially the same, and the outwardly extending opposed flanges being spaced sufficiently close to each other for a portion of the object to be snugly received in the groove therebetween,
wherein the object is a towel, a dish cloth, a potholder, or an oven mitt, and
wherein the object is permanently affixed to the connecting component between the flanges by a portion of the object positioned between the flanges being sewn onto the device at the flanges.

10. The combination of claim 9, wherein the object is permanently affixed to the connecting component between the flanges by a portion of the object positioned between the flanges being sewn onto the flanges.

11. The combination of claim 9, wherein the object is permanently affixed to the connecting component by thread that extends through the flanges and a portion of the object positioned between the flanges.

12. The combination of claim 9,
the hooking component being formed in the body by a first opening formed in the body and extending completely through the body in combination within a second opening formed in the body and extending completely through the body,
the second opening extending from the outer periphery of the body to the first opening creating a passageway extending from outside the body to the first opening, the passageway having a length extending from the outer periphery of the body to the first opening, and
the passageway being bordered by a first portion of the body and a second portion of the body, the first portion of the body extending along the length of the passageway, the second portion of the body extending along the length of the passageway, and the first portion of the body and the second portion of the body being positioned on opposite sides of the passageway from each other separated by the passageway.

13. The combination of claim 12,
wherein the device is formed from a flexible resilient material, and
wherein the device is sufficiently flexible and resilient such that the first and second portions of the body may be manipulated with respect to one another to permit the hooking component to be hooked onto a handle by inserting the device onto the handle such that the handle traverses the passageway to position the handle in the first opening of the body.

14. The combination of claim 13,
wherein the device is a single unitary piece, and
wherein the device is a single piece of injection molded thermoplastic rubber.

15. The combination of claim 14,
wherein the object is a potholder or an oven mitt.

16. The combination of claim 14,
wherein the object is permanently affixed to the connecting component between the flanges by a portion of the object positioned between the flanges being sewn onto the flanges.

17. The combination of claim 14,
wherein the object is permanently affixed to the connecting component by thread that extends through the flanges and a portion of the object positioned between the flanges.

* * * * *